Figure 1:
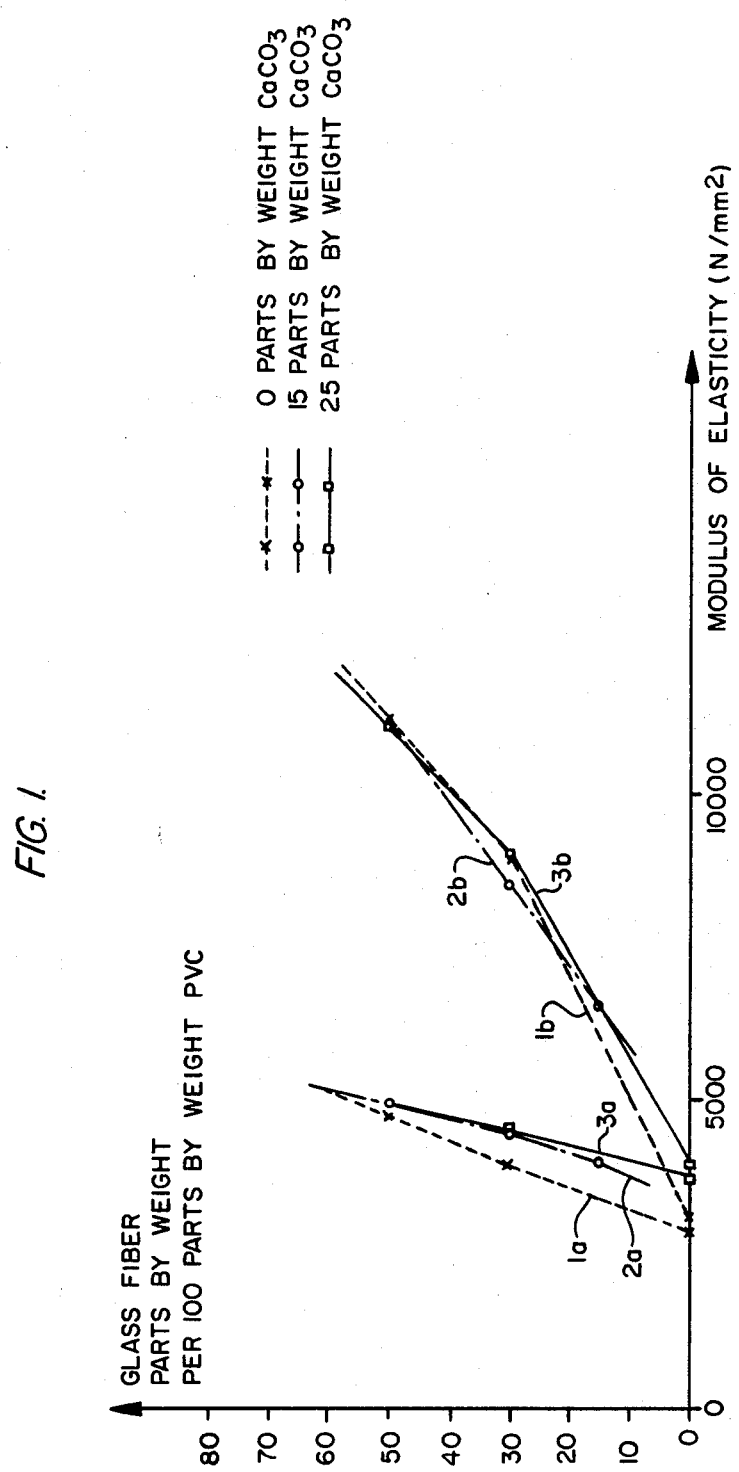

United States Patent [19]

Budich et al.

[11] 4,455,398

[45] Jun. 19, 1984

[54] GLASS FIBER REINFORCED POLYVINYL COMPOSITION

[75] Inventors: Wolfgang Budich, Troisdorf-Eschmar; Bertram Gasper, Troisdorf-Spich; Josef Kurth, Troisdorf-Spich; Karl-Günter Scharf, Troisdorf-Spich; Waldemar Wissinger, Siegburg, all of Fed. Rep. of Germany

[73] Assignee: Dynamit Nobel Aktiengesellschaft, Troisdorf, Fed. Rep. of Germany

[21] Appl. No.: 461,742

[22] Filed: Jan. 28, 1983

[30] Foreign Application Priority Data

Jan. 29, 1982 [DE] Fed. Rep. of Germany ....... 3202919

[51] Int. Cl.³ ............................ C08K 3/40; C08K 7/14
[52] U.S. Cl. ..................................... 523/220; 524/494; 524/567; 524/425
[58] Field of Search ................ 523/220; 524/494, 425, 524/567

[56] References Cited

U.S. PATENT DOCUMENTS

| | | | |
|---|---|---|---|
| 3,632,366 | 2/1972 | Hiraga et al. | 260/140 |
| 3,644,271 | 2/1972 | Tulley | 523/220 |
| 3,766,131 | 10/1973 | Arkles | 524/396 |
| 3,883,473 | 5/1975 | Kucsma | 524/494 |
| 3,932,573 | 1/1976 | Kucsma et al. | 264/118 |

FOREIGN PATENT DOCUMENTS 1498450  1/1978  United Kingdom .

*Primary Examiner*—Herbert J. Lilling
*Attorney, Agent, or Firm*—Antonelli, Terry & Wands

[57] ABSTRACT

A glass fiber-reinforced polyvinyl chloride composition contains, per 100 parts by weight of polyvinyl chloride of a K value of between 55 and 75, 40–100 parts by weight of glass fibers having a diameter of between 5 and 25 $\mu$m with a length of 0.5 to 12 mm, and 1–25 parts by weight of mineral filler having an average particle diameter of below 50 $\mu$m.

5 Claims, 2 Drawing Figures

GLASS FIBER REINFORCED POLYVINYL COMPOSITION

This invention relates to a glass fiber reinforced polyvinyl chloride composition made up of polyvinyl chloride resin, glass fibers, and inorganic fillers differing from the glass fibers and optionally customary additives, such as mold release agents, stabilizers, processing aids, colorants, or the like.

Efforts have been made in the art of synthetic resins to broaden the spectrum of materials offered by combining inactive or active fillers and reinforcing agents with classical thermoplastics. In this connection, raising of the strength and rigidity levels is desirable, on the one hand, while attempts are also made, on the other hand, to make such materials less expensive. Inactive fillers are understood to mean, in general, additives in the solid form differing with respect to their composition and structure from the synthetic resin matrix; in most cases, inorganic materials are involved here which are also called extender fillers, such as, for example, calcium carbonate, hydrated aluminas, and aluminosilicates. Active fillers are understood to mean those which, in a controlled fashion, improve certain mechanical or physical porperties of the synthetic resin; they are in most cases also called reinforcing fillers or agents. The best reinforcing agents are, in general, of a fibrous structure; the most frequently employed reinforcing material is constituted by glass fibers. While the inactive fillers in most instances have, rather, a lowering effect on tensile strength and toughness of the snythetic resin and are chemically inactive, and inexpensive, reinforcing fillers such as glass fibers impart a rigidifying effect and a satisfactory force application with low shrinkage with chemical inactivity. Disadvantages in the reinforcing fillers, such as glass fibers, are anisotropy, as well as orientation of the glass fibers when processing the synthetic resin composition.

DAS 2,540,639 discloses a pulverulent, glass fiber-reinforced extrusion composition based on polyvinyl chloride, made up on the basis of 15–30 parts by weight of mineral fillers having an average particle size of below 50 $\mu$m, 1.5–3 of at least one mold release agent and 15–30 parts by weight of glass fibers per 100 parts by weight of polyvinyl chloride. This composition makes it possible to manufacture reinforced articles wih a smooth surface and a homogeneous structure by the extrusion method.

As can be seen from DAS 2,540,639, and also from other literature references, considerable difficulties are encountered in homogeneously incorporating larger amounts of glass fibers into thermoplastic synthetic resins, especially also into polyvinyl chloride resin. In this procedure, there is not only a high amount of wear and tear on the processing machines, such as masticators, mixers, extruders, but there are also problems with respect to homogenization, i.e., the uniform distribution of the glass fibers within the thermoplastic, as well as regarding adhesion between glass fiber and thermoplastic. Thus, it has been known to subject glass fibers to a surface treatment; the best well-known of such treatments is silanizing in order to increase adhesion to the synthetic resin. In this connection, attention is invited, for example, to the article by B. W. Lipinsky, "Silane loesen Haftprobleme" [Silanes Solve Adhesion Problems] in defazet, 28th year, No. 5, 1974, pp. 207–211. British Pat. No. 1,345,841 describes a glass-reinforced thermoplastic composition to which are added, per 100 parts by weight of thermoplastic synthetic resin, 5–150 parts by weight of glass fibers and additionally 0.5–1.5 parts by weight of a special adhesion promoter based on metallocenes.

The invention is based on the object of providing a glass-reinforced composition based on polyvinyl chloride resin which, with higher glass fiber proportions than known for extrusion compositions according to DAS 2,540,639, yet has improved mechanical properties without any additional, special adhesion promoter according to British Pat. No. 1,345,841, and which can be perfectly processed into homogeneous molded articles.

The invention attains the thus-posed object by a composition containing, per 100 parts by weight of a polyvinyl chloride having a K value of between 55 and 75, 40–100 parts by weight of glass fibers with a diameter of between 5 and 25 $\mu$m with a length of up to 12 mm, and 1–25 parts by weight of a mineral filler having an average particle diameter of below 50 $\mu$m. It has been found surprisingly that it is possible, by the use of relatively small proportions of mineral, powdery fillers, together with relatively large proportions of glass fibers, to obtain a reinforced polyvinyl chloride composition which still can be excellently processed especially by extrusion and which has a balanced spectrum of properties. In particular, the modulus of elasticity can be increased as compared with non-reinforced polyvinyl chloride, achieving with the composition of this invention at least 8000 N/mm$^2$ at 23° C. as the modulus of elasticity for extruded products in the extrusion direction, as measured pursuant to DIN [German Industrial Standard] 53457.

"Polyvinyl chloride resin" as used herein is understood to mean polyvinyl chloride (i.e., homopolymer) produced by bulk, suspension, or emulsion polymerization with a K value of between 55 and 75; whereby the K-value refers to the homopolymer content of vinyl-chloride as well as polyvinylidene chloride; post-chlorinated polyvinyl chloride; and the copolymers obtained from a chlorinated monomer, e.g., vinyl chloride, and at least one monomer copolymerizable therewith, for example, a homopolymer of vinylchloride, or copolymers and/or graft polymers thereof, with, for example, ethylene-vinyl acetate, alkyl (e.g., methyl), acrylate, vinyl acetate, chlorinated polyethylene, butadiene, polyolefins, or similar compounds as the co- or graft component, as well as mixtures of these materials, wherein the vinyl chloride or the polyvinyl chloride constitutes at least about 75% by weight of the total weight of the polymeric material.

The mineral fillers in addition to the glass fibers serve, when used in amounts up to 25 parts by weight, hardly to render the composition less expensive, but rather, in essence, to improve the processing characteristics; the mechanical properties of the composition are only slightly affected. Too high a mineral filler content has a negative influence on the improvements of the mechanical properties which are to be brought about precisely by the use of glass fibers. Usable fillers are mineral fillers, such as, for example, natural or precipitated chalk, siliceous chalk, colloidal silicic acid, aluminosilicates, or hydrated alumina, with or without appropriate surface treatment, singly or in blends with one another. The particle size of the fillers is, if at all possible, not to exceed substantially the fiber diameter of the glass fibers; in other words, the maximum particle diameter of the filler is to be smaller than 50 μm, preferably smaller than 20 μm.

The starting material of glass fibers employed is constituted, depending on the processing method, either by endless or cut glass fibers having a preferred filament diameter of between 5 and 25 μm. In case of cut fibers, the initial length is to be at least 0.5 mm, preferably between 3 and 12 mm. By the processing and working operations, the initial length will be broken down anyway to a final length of between about 0.3 to 1.5 mm, for example, during extrusion. Basically, all types of glass fibers can be utilized for the invention as long as they are compatible with PVC. However, those fibers are used with preference which have been pretreated by an appropriate surface treatment with the addition of adhesion promoters, such as, for example, vinyl silane and substituted alkyl silanes, e.g., chloroalkyl, aminoalkyl, diaminoalkyl silanes, and others. However, this pretreatment takes place normally during the manufacturing process of the glass fibers, rather than in the processing of the PVC compositions. By the use of 40–100 parts by weight of glass fibers per 100 parts by weight of PVC according to this invention, a modulus of elasticity of at least 8000 N/mm² is attained in the finished product.

Unmodified polyvinyl chloride exhibits, besides a good impact resistance, an only moderate notched impact resistance. Notched impact resistance is only slightly affected by the addition of glass fibers, but the good impact resistance is reduced to the level of notched impact resistance. For this reason, a polymeric modifier is added to the composition in accordance with the invention, such as, for example, ethylene-vinyl acetate copolymer, polymethyl acrylate, chlorinated polyethylene, acrylate-butadiene-styrene copolymer, methyl, methacrylate-butadiene-styrene copolymer, or the like, with up to 30 parts by weight per 100 parts by weight of the polyvinyl chloride homopolymer (PVC).

As compared with the customary amounts of mold release additives in the processing of PVC, the compositions of this invention turn out to have an addition of mold release agent which is substantially increased over known compositions. This addition, in the composition of this invention, ranges preferably between 2.5 and 5.5. parts by weight of mold release agent per 100 parts by weight of polyvinyl chloride resin, the proportion of mold release agent rising with increasing proportion of glass fibers and fillers. The mold release agents known in the processing of PVC and PVC-containing molding compositions are utilized, i.e., normally mixtures of so-called internal mold release agents, in other words mold release agents well compatible with PVC, and so-called external mold release agents, in other words products less readily compatible with PVC. Among the group of the internal mold release agents are, for example, glycerol mono-, di-, and triesters of natural or oxidized carboxylic acids having chain lengths of $C_{12}$ to $C_{40}$, fatty alcohols of the aforementioned chain lengths, neutral and alkaline metallic soaps, preferably stearates, of the metals lead, clacium, barium, magnesium, cadmium, and others; $C_{10}$ to $C_{40}$ alcohols esterified with $C_{12}$ to $C_{36}$ acids; phthalic acid esters of long-chain alcohols, etc. In the group of external mold release agents belong, for example, fatty acids, $C_{12}$ to $C_{40}$ and/or substituted (oxidized) fatty acids, paraffin oils and solid paraffins, polyethylenes and/or oxidized polyethylenes, fatty acid amides, silicone oils, and similar compounds.

Moreover, the other additives customary in the processing of PVC-containing mixtures are utilized, in particular, stabilizers such as, for example, complex barium-cadmium soaps, lead salts and/or lead soaps, complex calcium-zinc soaps, alkyltin mercapto compounds, or alkyltin carboxylates, furthermore, organic stabilizers, such as epoxidized oils or esters, diphenylthioureas, phenylindole, arylic or alkylic or arylic-alkylic mixed phosphites, individually or in blends. Furthermore, it is also possible to add the composition conventional antioxidants, such as, for example, sterically hindered phenols or bisphenol or the like, especially for the stabilization of the modifying components and/or the co- or graft components. Preferred amounts range between 1 and 5 parts by weight of the stabilizers per 100 parts by weight of polyvinyl chloride resin.

Further conventional additives are processing aids, plasticizers, also plasticizing aids, and colorants.

A preferred composition according to this invention contains, per 100 parts by weight of polyvinyl chloride having a K value of between 55 and 75, 40–80 parts by weight of glass fibers with a diameter of between 5 and 25 μm with a length of 0.5–12 mm, 1–15 parts by weight of a powdery mineral filler having an average particle diameter of below 50 μm, and 2.5–5.0 parts by weight of a mold release agent, and up to 30 parts by weight of a polymeric modifier.

The present invention exhibits remarkable advantages rendering the glass fiber-reinforced polyvinyl chloride composition eminently suitable for use in the manufacture of molded articles, especially by the extrusion method, the molded articles exhibiting, in the extrusion direction, a modulus of elasticity of at least 8000N/mm² at 23° C. The thus-produced molded articles exhibit, depending on glass proportion and filler proportion, a very fine microporous surface whereby adhesion to subsequent coatings, for example, based on PVC or some other thermoplastic, is substantially improved. The composition of this invention can serve for the manufacture of core components of high mechanical rigidity and strength which are thereafter or simultaneously encased by a non-reinforced thermoplastic on the same basis or some other basis, for example, by means of extrusion, lamination or dipping. The casing can also be provided over only a portion of the surface of the molded article. For surface finishing, suitable materials are, in particular, those compatible with PVC, which can optionally also be weather-resistant, such as, for example, acrylates, polyesters, polymethacrylates, acrylate-containing polymers, or the like, and/or multiple coatings with various materials.

The composition of this invention makes it possible to manufacture molded articles having mechanical properties which are substantially improved over the non-reinforced synthetic resin, so that the molded articles can be utilized for supporting constructions and so that, for example, the use of metallic reinforcements widely used in profile constructions with the use of synthetic resins can be omitted, and/or the wall thicknesses of the profile members can be reduced.

The various components of the composition according to this invention can be homogenized with one another according to known techniques for the preparation of extrusible mixtures, and can then be extruded.

Examples 1 through 18 presented hereinafter serve to describe and explain the invention. In this connection, Examples 1–6, 8, 10, 12 and 13 are to be considered comparative examples, or examples lying outside of the invention; whereas Examples 7, 9, 11 and 14–18 serve to illustrate the invention. The examples are set forth in the table that follows. To obtain the composition, the components can be mixed together in dry pulverulent form and plasticized; from this composition, panels having a thickness of about 4 mm and a width of about 500 mm are extruded with the use of a single-screw extruder, for example. Extrusion was carried out with barrel temperatures rising from 160° to 190° C. at a die temperature of 195° C. These panels were used to produce the test specimens according to the standardized tests.

The components of the composition according to the examples are expressed in parts by weight; for Examples 1 through 13, a suspension PVC is used having a K value of 64, and for Examples 14–18, a suspension PVC is employed having a K value of 57. The various modifiers utilized in Examples 10–18 are designated by their abbreviations.

The properties were measured on the extruded panels, namely, respectively in the longitudinal and transverse directions. The modulus of elasticity was determined according to DIN 53457; the impact resistance (notched) according to Izod ASTM D 256, the tensile stress at break according to DIN 53455, the elongation at break according to DIN 53455, and the deflection temperature under load, Method A, in °C. according to ISO R 75.

Example 1 contains a non-reinforced PVC composition without additional fillers, as a comparative example. Examples 3 and 6 each comprise a reinforced composition with 30 and 50 parts by weight of glass fibers, respectively, without any other fillers. It can be seen therefrom that the modulus of elasticity rises by adding glass fibers, while the tensile stress at break is already somewhat on the decrease. By the addition of small amounts of a mineral filler, in this case calcium carbonate according to Example 7, however, it is possible to considerably improve the modulus of elasticity as well as the other mechanical properties, except for the elongation, as compared with Example 6 without a mineral filler.

Examples 2, 5 and 9 demonstrate, in a comparative series, how, in case of non-reinforced PVC, the property spectrum of the mechanical characteristics is altered with continuous addition of glass fibers for reinforcing purposes, with a constant proportion of mineral filler, in this case, calcium carbonate. It can be seen especially clearly from a comparison of Examples 7 and 9 that increased addition of mineral fillers to the glass fibers does not result in an essential improvement of properties; rather, the properties, with the proportions chosen according to this invention, are approximately in equilibrium, i.e. with a slightly declining modulus of elasticity and notched impact resistance, and with the tensile stress at break still being on the rise, good characteristics are obtained as compared to the product without mineral fillers, see Example 6. A comparison of Examples 4 and 8 shows that, with too low a proportion of glass fibers, the high rigidifying effect desired according to this invention for the molded articles based on the reinforced PVC composition is not as yet achieved.

Example 10 shows a composition containing an impact-resistant modifier to increase impact resistance (notched); however, this is accomplished at the cost of the modulus of elasticity, in particular, and the tensile stress at break. The latter can then be raised again in accordance with Example 11 merely by adding minor amounts of a mineral filler, such as calcium carbonate. Examples 12 and 13 show further addition of modifiers in higher proportions, which latter, however, do not have an enhancing effect on the mechanical properties, in particular, but rather have an adverse effect, in spite of an increase in notched impact resistance. Examples 14 through 18 demonstrate the addition of smaller proportions of polymeric modifiers to increase motched impact resistance, with constant addition of small amounts of calcium carbonate, and with a rising proportion of glass fibers. These examples show the improvement of the modulus of elasticity with rising glass fiber proportion while notched impact resistance and tensile stress at break are simultaneously retained to the desired extent. With notched impace resistance, the impact resistance of these compositions is likewise improved.

FIG. 1 shows the modulus of elasticity in dependence on the glass fiber proportion and the mineral filler in the composition. Curves 1a and 1b show the course of the modulus of elasticity according to Examples 1, 3, 6 in the longitudinal and transverse directions of the panel with 0 weight proportions of calcium carbonate; curves 2a, 2b show the modulus of elasticity with 15 parts by weight of calcium carbonate according to Examples 4, 8; and curves 3a, 3b show the same with 25 parts by weight of calcium carbonate in accordance with Examples 2, 5, 9.

Figure 2:
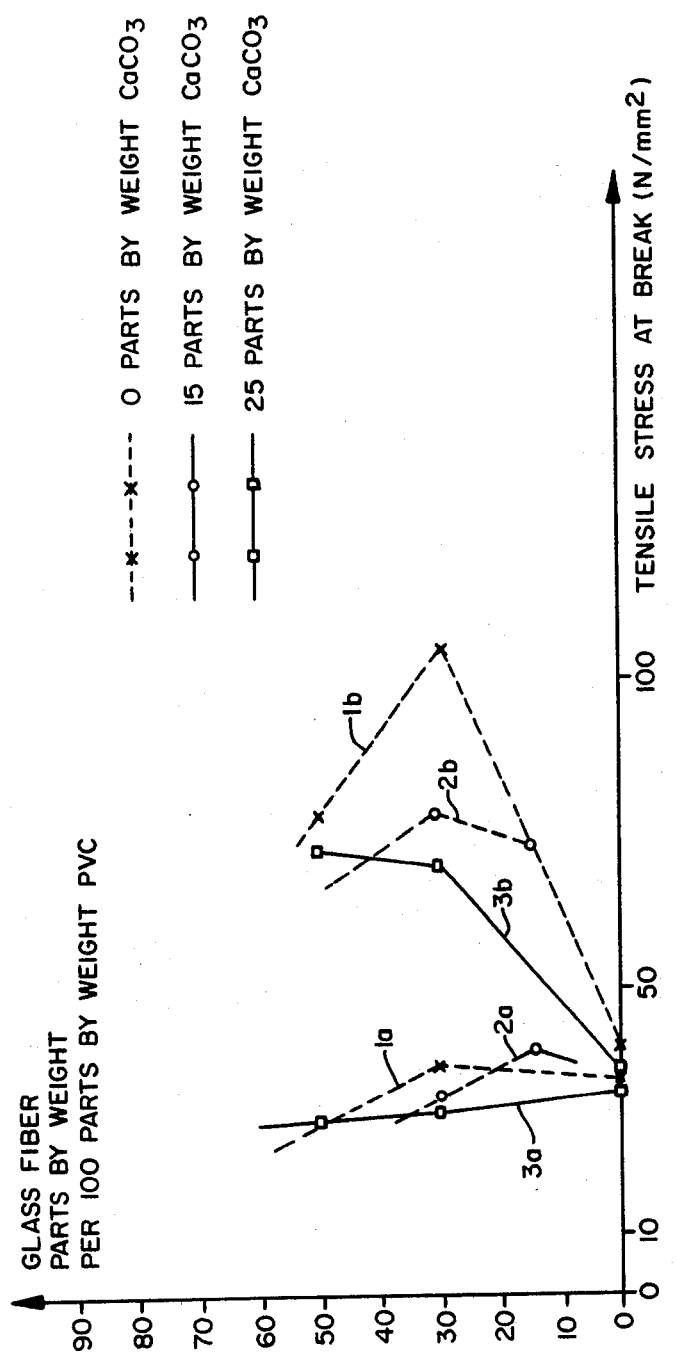

FIG. 2 depicts the dependency of the tensile stress at break on the glass fiber proportion and mineral filler proportion in correspondence with Examples 1, 3, 6, in curves 1a, 1b; in correspondence with Examples 4, 8, in curves 2a, 2b; and in correspondence with Examples 2, 5, 9, in curves 3a, 3b. It can be seen therefrom that the small amounts of mineral filler in addition to the glass fibers, as preferred according to the invention, improve the processability of the composition, on the one hand, but, on the other hand, exert only a small negative influence on the mechanical properties and essentially preserve the reinforcing properties attained by the addition of the glass fibers.

The good processability of the compositions according to this invention is surprising, leading in spite of the high glass fiber proportions to a homogeneous product distinguished by very good mechanical properties and low shrinkage (toward zero).

Low shrinkage in this connection means that the stresses frozen in during the processing of the composition of this invention into profiles or pipes will not be triggered later on during use of the products, even at higher temperatures; this can be proven, for example, by a high-temperature storage test at 100° C.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| S PVC, K Value 64 (57) | 100 | 100 | 100 | 100 | 100 | 100 | 100 | 100 | 100 | 85 |
| Stabilizer Mixture | 3 | 3 | 3 | 3 | 3 | 3 | 3 | 3 | 3 | 3 |
| Modifier | — | — | — | — | — | — | — | — | — | 15 MBS |
| Glass Fibers, Length 6 mm, $\phi$ 10 $\mu$m | — | — | 30 | 15 | 30 | 50 | 50 | 30 | 50 | 50 |

TABLE 1-continued

|  | | | | | | | | | | |
|---|---|---|---|---|---|---|---|---|---|---|
| CaCO₃ (Average Particle φ <10 μm) | — | 25 | — | 15 | 25 | — | 5 | 25 | 15 | — |
| 1,2-Hydroxystearic Acid | — | — | — | 0.3 | 0.6 | 0.3 | 0.3 | 0.6 | 0.6 | 0.3 |
| Oxidized PE Wax | 0.3 | 0.3 | 0.5 | 0.5 | 0.5 | 0.5 | 0.5 | 0.5 | 0.7 | 0.5 |
| Ca Stearate | 0.5 | 0.5 | 0.5 | 0.5 | 1.0 | 1.0 | 1.0 | 1.0 | 1.0 | 1.0 |
| C 16/18 Wax Esters/Epox. Soybean | 1.0 | 1.0 | 1.0 | 1.0 | 1.0 | 1.0 | 1.0 | 1.0 | 2.0 | 1.0 |
| Modulus of Elasticity | | | | | | | | | | |
| N/mm² at 23° C., transverse | 2,990 | 3,700 | 4,100 | 3,960 | 4,540 | 4,680 | 5,010 | 4,380 | 4,890 | 3,660 |
| longitudinal | 3,020 | 3,900 | 8,940 | 6,500 | 9,010 | 12,160 | 11,360 | 8,460 | 11,500 | 10,260 |
| Impact Resistance (Notched) | | | | | | | | | | |
| (Izod) J/m transverse | 55 | 54 | 35 | 36 | 33 | 36 | 41 | 39 | 39 | 44 |
| longitudinal | 65 | 67 | 54 | 45 | 45 | 56 | 69 | 58 | 73 | 82 |
| Tensile Stress at Break N/mm² | | | | | | | | | | |
| transverse | 35.0 | 33.0 | 37.1 | 40.1 | 30.5 | 27.3 | 36.3 | 31.4 | 38.2 | 29.2 |
| longitudinal | 39.8 | 36.0 | 105.1 | 72.3 | 70.4 | 78.8 | 86.8 | 78.1 | 73.7 | 70.1 |
| Elongation at Break, % | | | | | | | | | | |
| transverse | 28 | 43 | 7 | 8 | 5 | 8 | 2 | 6 | 2 | 2 |
| longitudinal | 49 | 53 | 3 | 2 | 2 | 2 | 2 | 2 | 2 | 2 |
| Deflection Temperature under Load in °C., Method A | | | | | | | | | | |
| ISO/R 75 transverse | 75 | 75 | 73 | 73 | 72 | 73 | 81 | 71 | 78 | 78 |
| longitudinal | 76 | 77 | 79 | 77 | 81 | 86 | 86 | 83 | 84 | 87 |

| | Examples | | | | | | | |
|---|---|---|---|---|---|---|---|---|
| | 11 | 12 | 13 | 14 | 15 | 16 | 17 | 18 |
| S PVC, K Value 64 (57) | 85 | 70 | 80 | 100 (K 57) | 100 (K 57) | 100 (K 57) | 100 (K 57) | 100 (K 57) |
| Stabilizer Mixture | 3 | 3 | 3 | 4 | 4 | 4 | 4 | 4 |
| Modifier | 15 MBS | 30 MBS | 20 CPE | 10 (EVA) | 10 (EVA) | 10 (EVA) | 10 (EVA) | 10 (EVA) |
| Glass Fibers, Length 6 mm, φ 10 μm | 50 | 50 | 50 | 50 | 60 | 70 | 80 | 100 |
| CaCO₃ (Average Particle φ <10 μm) | 5 | — | — | 5 | 5 | 5 | 5 | 5 |
| 1,2-Hydroxystearic Acid | 0.3 | 0.3 | 0.3 | 0.2 | 0.2 | 0.2 | 0.3 | 0.4 |
| Oxidized PE Wax | 0.5 | 0.5 | 0.5 | — | — | — | — | — |
| Ca Stearate | 1.0 | 1.0 | 1.0 | 1.0 | 1.0 | 1.0 | 1.0 | 1.0 |
| C 16/18 Wax Esters/Epox. Soybean | 1.0 | 1.0 | 1.3 | 3 | 3 | 3 | 3.5 | 3.8 |
| Modulus of Elasticity | | | | | | | | |
| N/mm² at 23° C., transverse | 4,070 | 3,150 | 3,580 | 4,230 | 4,550 | 4,860 | 4,880 | 5,870 |
| longitudinal | 11,730 | 8,750 | 10,480 | 10,790 | 10,510 | 12,730 | 15,560 | 20,670 |
| Impact Resistance (Notched) | | | | | | | | |
| (Izod) J/m transverse | 43 | 54 | 69 | 37 | 37 | 39 | 39 | 53 |
| longitudinal | 91 | 176 | 133 | 69 | 75 | 80 | 59 | 72 |
| Tensile Stress at Break N/mm² | | | | | | | | |
| transverse | 31.4 | 25.4 | 24.6 | 33.9 | 32.4 | 28.4 | 21.3 | 20.7 |
| longitudinal | 98.9 | 72.7 | 64.6 | 83.8 | 91.2 | 88.6 | 75.7 | 66.6 |
| Elongation at Break, % | | | | | | | | |
| transverse | 2 | 2 | 2 | 2 | 2 | 2 | 2 | 2 |
| longitudinal | 2 | 2 | 2 | 2 | 2 | 2 | 2 | 2 |
| Deflection Temperature under Load in °C., Method A | | | | | | | | |
| ISO/R 75 transverse | 71 | 67 | 72 | 68 | 67 | 66 | 69 | 66 |
| longitudinal | 79 | 77 | 77 | 72 | 72 | 75 | 77 | 76 |

MBS = Methylmethacrylate butadiene glycol copolymer
CPE = Chlorinated polyethylene
EVA = Ethylene vinyl acetate copolymer

We claim:

1. An extrudable glass fiber-reinforced polyvinyl chloride composition made up of polyvinyl chloride resin having a K value between 55 and 75, glass fibers, and inorganic fillers different from the glass fibers, and conventional additives, including mold release agents, stabilizers, processing aids, and colorants for the production of extruded articles, said composition containing, per 100 parts by weight of a polyvinyl chloride resin, 50-100 parts by weight of glass fibers having a diameter of between 5 and 25 μm with a length up to 12 mm, and 5-25 parts by weight of a mineral filler having an average particle diameter of below 50 μm and exhibiting a modulus of elasticity in the extrusion direction of an extruded product of at least 8,000N/mm² at 23° C.

2. A composition according to claim 1, wherein additionally up to 30 parts by weight of polymeric modifier for enhancing the impact strength of a extruded product formed from said composition is contained therein, said composition exhibiting modulus of elasticity in the extrusion direction of the extruded product of at least 10,000N/mm² at 23° C. and an elongation at break in the transverse direction on the order of 2%.

3. A composition according to claim 1, wherein additionally 2.5-5.5 parts by weight of mold release agent is contained therein.

4. A composition according to claim 2, wherein said composition contains, per 100 parts by weight of the polyvinyl chloride resin, 50-80 parts by weight of glass fibers having a diameter of between 5 and 25 μm with a length of 0.5-12 mm, 5-15 parts by weight of a powdery mineral filler having an average particle diameter of below 50 μm, 2.5-5.0 parts by weight of a mold release agent, and up to 30 parts by weight of the polymeric modifier.

5. A molded article obtained by extrusion from the glass fiber-reinforced polyvinyl chloride composition according to claim 1 exhibiting a modulus of elasticity in the extrusion direction of at least 8000N/mm² at 23° C.

* * * * *